United States Patent
Asano et al.

(10) Patent No.: US 10,334,180 B1
(45) Date of Patent: Jun. 25, 2019

(54) DIGITAL IMAGE CAPTURE WITH A POLARIZER AT DIFFERENT ROTATION ANGLES

(71) Applicant: Motorola Mobility LLC, Chicago, IL (US)

(72) Inventors: Yuta Asano, Chicago, IL (US); Lin Chen, Chicago, IL (US); John Christopher Pincenti, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/905,818

(22) Filed: Feb. 26, 2018

(51) Int. Cl.
*H04N 5/238* (2006.01)
*H04N 5/232* (2006.01)
*H04N 5/235* (2006.01)
*G02B 27/28* (2006.01)

(52) U.S. Cl.
CPC .......... *H04N 5/238* (2013.01); *G02B 27/281* (2013.01); *H04N 5/2351* (2013.01); *H04N 5/2353* (2013.01); *H04N 5/23229* (2013.01)

(58) Field of Classification Search
CPC .. H04N 5/2356; H04N 5/238; H04N 5/23229; H04N 5/2351; H04N 5/2353; H04N 5/2254; G02B 27/281; G03B 11/00; G03B 17/12
See application file for complete search history.

(56) References Cited

U.S. PATENT DOCUMENTS

| | | | | |
|---|---|---|---|---|
| 6,028,303 | A * | 2/2000 | Suzuki | G02B 27/281 250/225 |
| 8,059,275 | B1 * | 11/2011 | Pinhasov | G02B 27/281 356/364 |
| 2009/0179143 | A1 * | 7/2009 | Murooka | G02B 27/281 250/225 |
| 2010/0157082 | A1 * | 6/2010 | Katerberg | G02B 27/281 348/222.1 |
| 2013/0083166 | A1 * | 4/2013 | Shintani | H04N 13/239 348/46 |

* cited by examiner

*Primary Examiner* — Nelson D. Hernández Hernández
(74) *Attorney, Agent, or Firm* — SBMC

(57) ABSTRACT

In aspects of digital image capture with a polarizer at different rotation angles, a device includes a polarizer that filters light at different polarizations and captures digital images using the polarizer. Each of the digital images are captured at one of different rotation angles of the polarizer. The device implements an imaging algorithm to determine a common region in each of the digital images, the common region having a variable brightness in each of the digital images and the common region in a respective digital image being determined based on a standard deviation of brightness for each pixel in the respective digital image. The imaging algorithm can then determine pixel brightness values of the pixels in the common region for each of the digital images, and select one of the captured digital images with a lowest pixel brightness value in the common region as an output image.

20 Claims, 9 Drawing Sheets
(3 of 9 Drawing Sheet(s) Filed in Color)

602

604

DIGITAL IMAGE CAPTURE WITH A POLARIZER AT DIFFERENT ROTATION ANGLES

BACKGROUND

A digital image captured with a camera device can include an area of unwanted reflected light in the captured image. The area of reflected light in the captured image can occur due to a limited dynamic range of the camera device, or may also occur due to strong light reflections from a surface in an environment of the captured image. For example, unwanted reflected light in a captured image that includes a portion of the sky can cause the sky to appear pale or washed-out, as opposed to having a blue appearance. Conventional techniques used for capturing digital images typically utilize a polarizer, such as a polarizing lens, to change a balance of the light in a captured image. However, capturing images utilizing the polarizer with the camera device can be challenging due to lighting conditions. A typical polarizer used with a camera device filters light at a particular polarization prior to the light entering the camera device and being captured as the digital image. The digital images captured with the camera device using the polarizer can still include areas of unwanted reflected light within an image, such as based on the position and angle of the sun relative to the direction in which the image is captured, and based on a rotational orientation of the polarizer. Other examples include a flash of the camera device or another light source that may cause light reflections from a surface in the environment of a captured image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Implementations of digital image capture with a polarizer at different rotation angles are described with reference to the following Figures. The same numbers may be used throughout to reference like features and components shown in the Figures.

DETAILED DESCRIPTION

Figure 1:
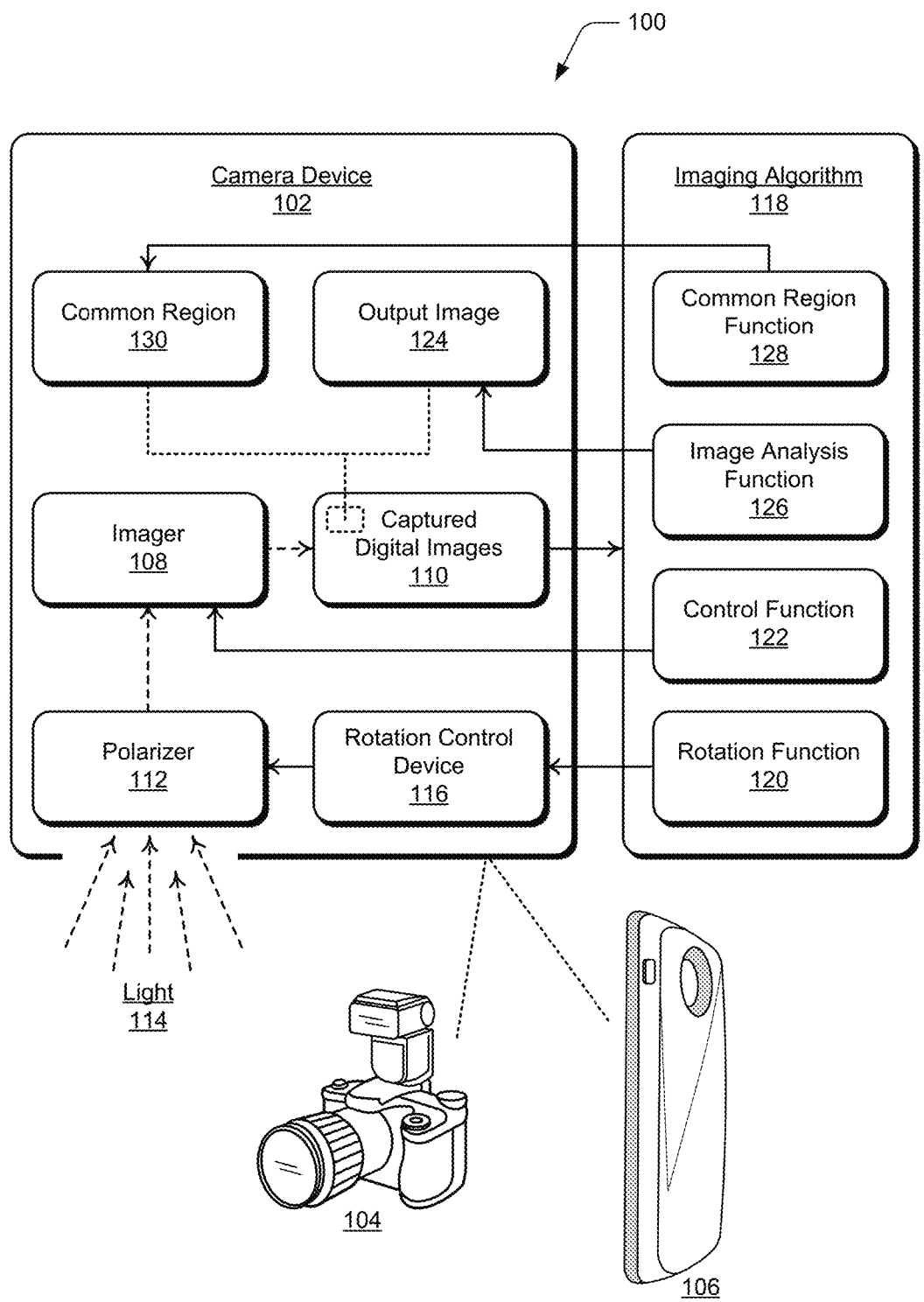
FIG. 1 illustrates an example system that can be used to implement techniques of digital image capture with a polarizer at different rotation angles as described herein.

Implementations of digital image capture with a polarizer at different rotation angles are described, and provide techniques to capture digital images using an automatic rotatable polarizer. Generally, a polarizer is a filter that only passes light with a specific type of polarization and blocks light of other types of polarization. The polarizer reduces the amount of light reaching an imaging sensor, also referred to as an imager, of a camera device by filtering of the light. The light with the specific type of polarization that passes through the linear polarizer is based on a rotational orientation of the polarizer and an angle of polarization of the light reaching the imager. Rotation of the polarizer provides flexibility in filtering the light at various different polarizations as the light passes through the polarizer. Typical applications of a polarizer in photography include to preserve highlights, reduce glare or reflections from a surface in a scene or environment, and to enhance sky color in captured images.

A digital image captured with a camera device can include an area of unwanted reflected light in the captured image. The light reflections may occur from a surface in an environment of the captured image, and to obtain a desired image, it is necessary to filter out this reflected light. A property of light is its polarization state, which represents the direction of oscillation of the light waves. Typically, in a natural environment, light is randomly polarized. However, when light is reflected off a surface, it often becomes linearly polarized. A filter that selectively passes a particular polarization state can therefore be used to block the unwanted reflected light. This will eliminate strong reflections, such as those from glass or water, which will obscure parts of a captured image. As another example, light in a captured image that includes a portion of the sky can cause the sky to appear pale or washed-out. However, this light is often polarized and can be filtered out using a polarizer resulting in a more blue color appearance.

Conventional techniques used for capturing digital images typically utilize a polarizer to change the balance of the light in a captured image. However, capturing images utilizing the polarizer with the camera device can be challenging. A typical polarizer used with a camera device filters light at a particular polarization prior to the light entering the camera device and being captured as the digital image. The direction of polarization of the unwanted light within an image, such as based on the position and angle of the sun relative to the direction in which the image is captured, can vary and therefore the orientation of the polarizing filter has to be adjusted accordingly. In the conventional techniques, this adjustment is performed manually, can be time consuming, and difficult to obtain the optimal results.

In aspects of digital image capture with a polarizer at different rotation angles, a camera device, such as any type of digital camera or mobile device that includes at least one integrated camera, can be used to capture a digital image of a scene or environment. Generally, as a type of computing device, the camera device implements a rotation control device that rotates a polarizer. The camera device can also implement an imaging algorithm that activates an imager of the camera device to capture light that passes through the polarizer filtered at a particular polarization, or at several different polarizations. The imaging algorithm can initiate rotation of the polarizer via the rotation control device, and capture the light that passes through the polarizer filtered at the different rotation angles of the polarizer. Multiple digital images can be captured as the polarizer is rotated, such that each of the multiple digital images captures the light that passes through the polarizer and is filtered at the various different rotation angles of the polarizer.

The imaging algorithm can then process the captured digital images and determine an output image based on pixel brightness in a common region in each of the digital images. This common region in each of the digital images is an area of pixels where the brightness of light varies given that the brightness variations occur in the digital images due to the polarization change. For example, a light reflection from a surface is captured in the digital images, and the light reflection will generally occur in approximately the same area or region of each of the digital images. The common region in the digital images that contains the light reflection will have a variable brightness, from one image to the next, because of the filtering of the light reflection by the polarizer as the digital images are captured. This common region is depicted in each of the digital images and the variable brightness of light in the common region changes with each respective digital image based on a corresponding different rotation angle of the polarizer.

When the common region in each of the digital images has been determined, the imaging algorithm can then determine pixel brightness values of pixels in the common region for each of the digital images. The imaging algorithm can then select one of the digital images with a lowest pixel brightness value as a representative output image that generally has the least glare or surface reflections, and/or has the better enhanced colors or highlights in the digital image. In implementations, the imaging algorithm can average the pixel brightness values of pixels in the common region for each of the digital images, and then select the representative output image as the digital image with the lowest average pixel brightness value. The output image can then be stored in memory of the camera device, on another device communicatively coupled to the camera device, and/or at a network storage device (e.g., in cloud-based storage).

In aspects of digital image capture with a polarizer at different rotation angles, the digital images may be captured with an automatic exposure setting of the camera device. The use of the automatic exposure setting can cause one or more of the captured digital images to have a different exposure than the other digital images. The imaging algorithm can be implemented to compensate for the different exposures among the digital images by modifying image brightness values of the digital images. When the imaging algorithm has compensated for the different exposures among the digital images, the imaging algorithm can then determine the common region in the digital images and select an output image, as noted above.

In implementations, the camera device can be a dual-camera device that includes two imagers, where one of the two imagers is fitted with the rotation control device and a polarizer. This arrangement enables one of the imagers to receive filtered light via the polarizer, and the other imager receives full or unfiltered light. The imaging algorithm can be implemented to capture multiple filtered digital images with the imager having the polarizer, and also capture one or more unfiltered digital images with the imager that does not have a polarizer. The imaging algorithm can then utilize the unfiltered light images to modify image brightness values of the filtered digital images, and determine the common region in the filtered digital images to select an output image as noted above. Additionally, the imaging algorithm can combine the output image and one of the unfiltered digital images to create a final image. In this way, a dual-camera device can take advantage of using the polarizer without sacrificing much of the light loss associated with polarizers.

While features and concepts of digital image capture with a polarizer at different rotation angles can be implemented in any number of different devices, systems, environments, and/or configurations, implementations of digital image capture with a polarizer at different rotation angles are described in the context of the following example devices, systems, and methods.

FIG. 1 illustrates an example system 100 that can be used to implement techniques of digital image capture with a polarizer at different rotation angles as described herein. In this example, the camera device 102 may be any type of digital camera 104 or mobile device 106, such as a mobile phone, tablet device, and/or wearable device. The camera device 102 includes an imager 108, which activates to capture digital images, such as captured digital images 110 that are stored in device memory as described herein. Generally, the camera device 102 is an electronic and/or computing device implemented with various components, such as a processing system and memory, as well as any number and combination of different components as further described with reference to the example device shown in FIG. 9.

A digital image that is captured with the imager 108 of the camera device 102 generally refers to the functions performed by the camera device 102 to image a digital photo when initiated by a photographer or user of the camera device to photograph a person, object, scene, environment, or other type of subject. In terms of digital imaging, image metadata of a captured image 110 can also be recorded and stored in the device memory along with a captured digital image, and the image metadata can include such information as a timestamp (e.g., date and time), location data corresponding to when and where an image is captured, and any other information about a digital image, such as exposure and lighting characteristics. The image metadata can also include camera information about camera settings associated with the digital image when the image is captured, such as exposure, focal length, ISO speed rating, flash, camera make and model, lens make and model.

In this example, the camera device 102 includes a polarizer 112 that filters light 114 based on a rotational orientation of the polarizer prior to a digital image 110 being captured by the imager 108. The polarizer 112 can be an integrated component of the camera device 102, or may be an external peripheral component that either attaches to the camera device or is positioned in the path of the light 114. For example, the digital camera 104 or the mobile device 106 can include the polarizer 112 as an integrated component of the device along with the imager 108 as further described with reference to the example device shown in FIGS. 2 and 3. Alternatively, the polarizer 112 may be an attachable component that attaches to the digital camera 104 or to the mobile device 106. In implementations, the polarizer may be a linear polarizer, or implemented as a circular polarizer, which is a linear polarizer followed by a quarter wave plate.

The camera device 102 includes a rotation control device 116 that is implemented to rotate the polarizer 112 at different degrees to capture the digital images 110 at the various different rotation angles of the polarizer. The rotation control device 116 can be implemented as an electromechanical device that controls rotation of the polarizer 112 through three-hundred-and-sixty degrees (360°). It should be noted that the effective range of rotating the polarizer 112 is between zero degrees and one-hundred-and-eighty degrees (0°-180°). Images captured with the polarizer 112 rotated between zero degrees and one-hundred-and-eighty degrees (0°-180°) are the same as capturing the images with the polarizer rotated between one-hundred-and-eighty degrees and three-hundred-and-sixty degrees (180°-360°). The rotation control device 116 can be implemented to respond to commands and/or signals to rotate the polarizer 112 through the range of the different degrees, which causes the light 114 to be filtered at the various different rotation angles of the polarizer 112 prior to being captured as the digital images 110 by the imager 108.

In this example, the system 100 also includes an imaging algorithm 118 that implements features of digital image capture with a polarizer at different rotation angles. The imaging algorithm 118 includes a rotation function 120 that can be implemented to communicate commands and/or signals to the rotation control device 116. For example, the rotation function 120 communicates a command to the rotation control device 116 that causes the rotation control device 116 to rotate the polarizer 112. The command communicated to the rotation control device 116 can indicate a specified number of degrees to rotate the polarizer 112, and in response the rotation control device 116 rotates the polarizer 112 by the specified of number of degrees. Alternatively, the rotation function 120 can communicate a signal to the rotation control device 116 that is implemented to rotate the polarizer 112 based on a pulse width of the signal. The rotation function 120 can adjust the pulse width of the signal to achieve the desired amount of rotation of the polarizer 112.

The imaging algorithm 118 also includes a control function 122 implemented to activate the imager 108 to capture the light 114 that passes through the polarizer 112 based on the rotational orientation of the polarizer 112. The captured light by the imager 108 can be stored as a captured digital image 110 in memory of the camera device 102 as further described with reference to the example mobile device shown in FIG. 2.

In aspects of digital image capture with a polarizer at different rotation angles, the imaging algorithm 118 can be implemented to rapidly capture multiple digital images with the imager 108 of the camera device 102, such that each of the captured digital images 110 is captured at one of the different rotation angles of the polarizer 112. For example, the imaging algorithm 118 can be implemented to capture the digital images 110 at fifteen degree (15°) increments between zero degrees and one-hundred-and-eighty degrees (0°-180°) by communicating with the rotation control device 116 to rotate the polarizer 112 as discussed above.

The polarizer 112 can be positioned by the rotation function 120 via the rotation control device 116 to have a rotational orientation at zero degrees (0°). The imaging algorithm 118 can then invoke the control function 122 to activate the imager 108 to capture a first image of the light 114 that passes through the polarizer having the rotational orientation at zero degrees (0°). The imaging algorithm 118 can then utilize the rotation function 120 to communicate to the rotation control device 116 to rotate the polarizer 112 fifteen degrees (15°), and the control function 122 can activate the imager 108 to capture a second image of the light 114 that passes through the polarizer 112 having the rotational orientation at fifteen degrees (15°). The imaging algorithm 118 can repeat this process to capture a total of twelve digital images 110 at fifteen degree (15°) increments of the polarizer 112 with the imager 108 of the camera device 102.

Alternatively, the imaging algorithm 118 can be implemented to capture the digital images at any suitable rotation angle of the polarizer 112 by communicating with the rotation control device 116 to rotate the polarizer 112. For example, the imaging algorithm 118 can be implemented to capture the digital images 110 at three degree (3°) increments between zero degrees and one-hundred-and-eighty degrees (0°-180°) to capture a total of sixty (60) digital images in a similar manner as discussed in the example above. In another example, the imaging algorithm 118 can be implemented to capture the digital images 110 at particular rotational orientations of the polarizer 112, such as capturing images at two degrees (2°), ten degrees (10°), thirty degrees (30°), sixty degrees (60°), one-hundred-and-forty degrees (140°), and one-hundred-and-seventy degrees (170°) of the polarizer 112. Various other increments or rotational orientations of the polarizer 112 to capture the digital images are contemplated.

The imaging algorithm 118 can then receive and process the captured digital images 110 to determine an output image 124 from the captured digital images 110 by utilizing an image analysis function 126 and a common region function 128. In implementations, the captured digital images 110 may be captured by the imager 108 using an exposure that is constant among the captured digital images 110. In other implementations, the captured digital images 110 may be captured by the imager 108 using an exposure that is not constant among the captured digital images 110. For example, an auto-exposure setting on the camera device 102 can be used to capture the digital images, where the auto-exposure setting automatically adjusts an exposure setting for each digital image captured by the camera device 102. When the exposure among the captured digital images 110 is varied or not constant, pixel brightness values for each of the captured digital images can be modified to compensate for the different exposures between the digital images.

The image analysis function 126 can be implemented to determine whether the captured digital images 110 were captured at a constant exposure, such as by using image metadata associated with each of the captured digital images 110 to determine whether the exposure is constant among the captured digital images 110. If it is determined that the exposure is not constant among the digital images, then one or more of the captured digital images 110 was captured at a different exposure than the other captured digital images 110.

The image analysis function 126 can also be implemented to modify or adjust pixel brightness values for each of the captured digital images 110 in response to the determination that the exposure is not constant among the captured digital images 110. To facilitate the modification of the pixel brightness values, the image analysis function 126 can obtain an exposure index from the image metadata for each of the captured digital images 110, where the exposure index of a respective digital image corresponds to scene brightness. The image analysis function 126 can then convert the exposure index to lux (a unit of illumination) for each of the captured digital images 110. The conversion from the exposure index to lux can be expressed by the following equation:

$$Lux = e^{\left(\frac{ExposureIndex - B}{A}\right)} \qquad \text{eq. 1}$$

In equation 1 above, the constants A and B represent values that are specific to a particular device. For example, A can represent a value of −33.82 and B can represent a value of 522.75 associated with the camera device 102.

The image analysis function 126 can then determine a multiplier for each of the captured digital images 110 based on the exposure index to lux conversions for each of the captured digital images 110, as described above. The determination of the multiplier for each of the captured digital images 110 can be expressed by the following equation:

$$r_i = \frac{Lux_i}{Lux_{median}} \qquad \text{eq. 2}$$

As shown in equation 2 above, the multiplier for each of the captured digital images 110 ($r_i$, where i is an image identifier of one of the captured digital images 110) is based on the lux value for a particular captured digital image ($Lux_i$) and a median lux value of all the captured digital images ($Lux_{median}$).

The image analysis function 126 can then modify the pixel brightness values for each of the captured digital images 110 based on a respective multiplier. For example, the pixel brightness values for each of the captured digital images 110 can be multiplied by the respective multiplier to compensate for one or more digital images captured at different exposures of the camera device 102. The modification of the pixel brightness can be expressed by the following equation:

$$I_{i,modified} = I_{i,original} * r_i \qquad \text{eq. 3}$$

As shown in equation 3 above, the pixel brightness values for each of the captured digital images 110 ($I_{i,original}$) is modified by its respective multiplier ($r_i$) determined in eq. 2 above.

The imaging algorithm 118 can invoke the common region function 128 subsequent to the image analysis function 126 modifying the pixel brightness values for each of the captured digital images 110 in response to the determination that the exposure is not constant among the captured digital images. Alternatively, the imaging algorithm 118 can invoke the common region function 128 subsequent to the image analysis function 126 determining that the captured digital images 110 were captured at a constant exposure.

The common region function 128 of the imaging algorithm 118 is implemented to determine a common region 130 in each of the captured digital images 110, where the common region has a variable brightness in each of the digital images. This common region 130 in each of the digital images 110 is an area of pixels where the brightness of light varies given that the brightness variations occur in the digital images due to polarization change. In this example, the common region 130 in the captured digital images 110 is determined based on a standard deviation of brightness for each pixel in the captured digital images 110. For example, the common region function 128 can generate a standard deviation of brightness for each pixel of the captured digital images 110. The common region 130 can be defined as an area of pixels in the captured digital images 110 having a standard deviation of brightness greater than a threshold value on a scale from zero to two-hundred-and-fifty-five (0-255). For example, the common region function 128 can determine the common region 130 as an area in the captured digital images 110 having a standard deviation greater than fifteen (15) as further described with reference to the example visualization of a common region shown in FIG. 5.

When the common region 130 in the captured digital images 110 has been determined, the imaging algorithm 118 can invoke the image analysis function 126 to determine the pixel brightness values of pixels in the common region of the captured digital images 110. The image analysis function 126 can then select one of the captured digital images 110 that has a lowest pixel brightness value in the common region as the output image 124. In implementations, the image analysis function 126 can average the pixel brightness values of pixels in the common region for each of the digital images 110, and then select the captured digital image that has the lowest average pixel brightness value in the common region. The imaging algorithm 118 can also store the output image 124 in memory of the camera device 102 or at a network storage device (e.g., in a cloud-based storage).

Figure 2:
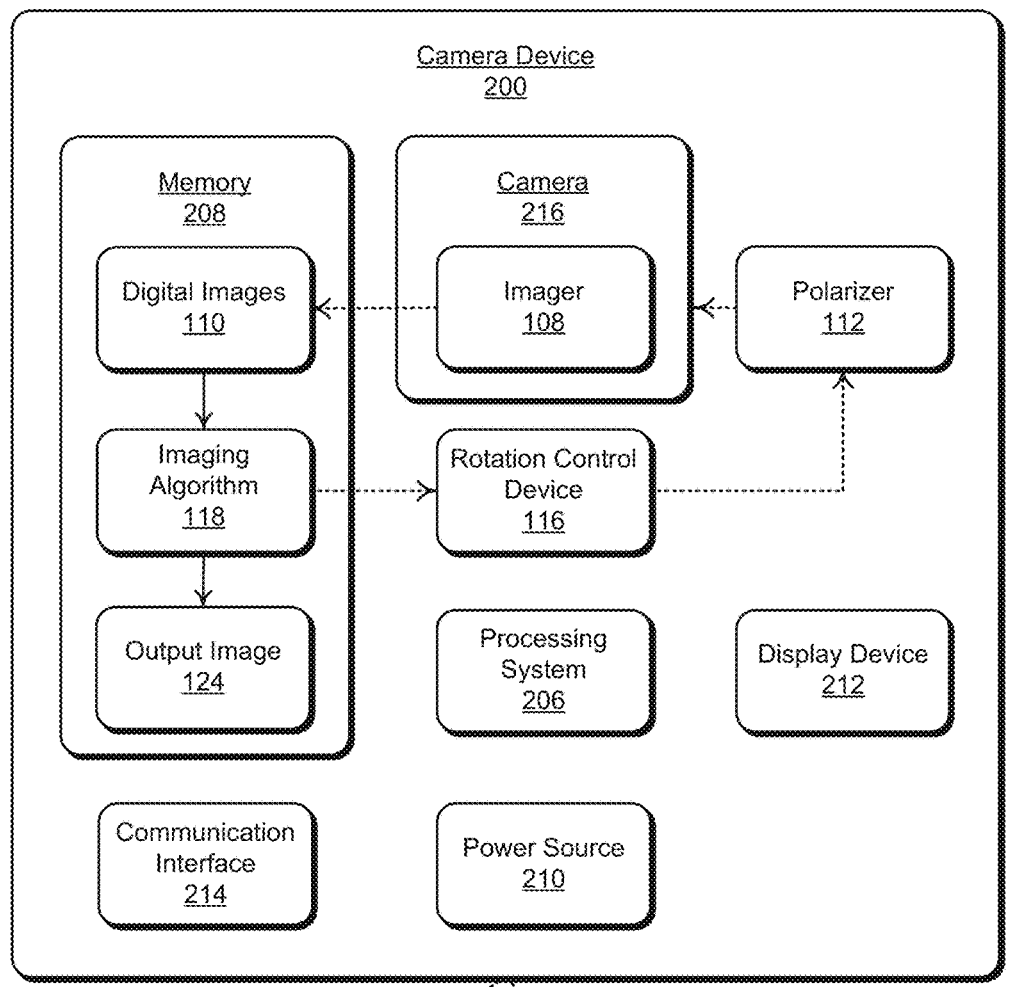
FIG. 2 illustrates an example camera device for digital image capture with a polarizer at different rotation angles to implement the techniques described herein.
Figure 2:
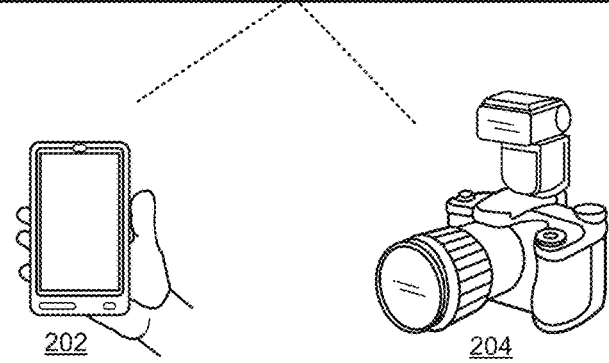

FIG. 2 illustrates an example camera device 200 in which aspects of digital image capture with a polarizer at different rotation angles can be implemented. The example camera device 200 includes any type of mobile device, such as a mobile phone 202 or any type of a camera device, such as a digital camera 204 that includes the polarizer 112 and the rotation control device 116, either as an integrated component of the camera device 200 or as an attachment that operates with the camera device 200. Generally, the camera device 200 is any type of an electronic and/or computing device implemented with various components, such as a processing system 206 and memory 208, as well as any number and combination of different components as further described with reference to the example device shown in FIG. 9. For example, the camera device 200 can include a power source 210, a display device 212, and a communication interface 214. In this example, the camera device 200 may be implemented as the camera device 102 that is shown and described with reference to FIG. 1.

The camera device 200 can include a camera 216 having the imager 108 implemented to capture digital images, such as the digital images 110, that are stored in memory 208 of the camera device. Alternatively or in addition, the digital images 110 can be stored in another device communicatively coupled with the camera device 200 or at a network storage device (e.g., in a cloud-based storage) via the communication interface 214.

In this example, the camera device 200 includes the imaging algorithm 118 that implements features of digital image capture with a polarizer at different rotation angles, as shown and described with reference to FIG. 1. The imaging algorithm 118 can be implemented as a software application or software module, such as computer-executable software instructions that are executable with a processor (e.g., with the processing system 206). As a software application, the imaging algorithm 118 can be stored on computer-readable storage memory (e.g., the memory 208), or any suitable memory device or electronic data storage implemented with the camera device. Alternatively, the imaging algorithm 118 may be implemented in hardware, or as a combination of software and hardware components.

In aspects of digital image capture with a polarizer at different rotation angles, the imaging algorithm 118 can be implemented to rapidly capture multiple digital images with the imager 108 of the camera 216 in the camera device 200, such that each of the digital images 110 is captured at one of the different rotation angles of the polarizer 112. The imaging algorithm 118 shown in FIG. 2 can include the rotation function 120, the control function 122, the image analysis function 126, and the common region function 128 as shown and described with reference to FIG. 1.

As described above with reference to FIG. 1, the imaging algorithm 118 can select one of the digital images 110 as the output image 124 that can be stored in the memory 208 of the camera device 200. Alternatively or in addition, the output image 124 can be stored in another device communicatively coupled with the camera device 200 or at a network storage device (e.g., in a cloud-based storage) via the communication interface 214. The imaging algorithm 118 can also display the output image 124 and/or the captured digital images 110 on the display device 212.

In some implementations, as noted above, the polarizer 112 and the rotation control device 116 are included in an attachment device that operates with the camera device 200 via the communication interface 214. For example, a mobile phone 202 may include the camera device 200 without the polarizer 112 or the rotation control device 116. The attachment device, which includes the polarizer 112 and the rotation control device 116, attaches to the mobile phone to operate with the camera device of the mobile phone. The imaging algorithm 118 can be stored in memory of the mobile phone 202 or in the attachment device, which is executed by the processing system 206 of the mobile phone or the attachment device. The imaging algorithm 118 communicates with the rotation control device 116 of the attachment device to rotate the polarizer 112, and communicates with the camera device 200 of the mobile phone to capture images using the techniques discussed herein via the communication interface 214.

Figure 3:
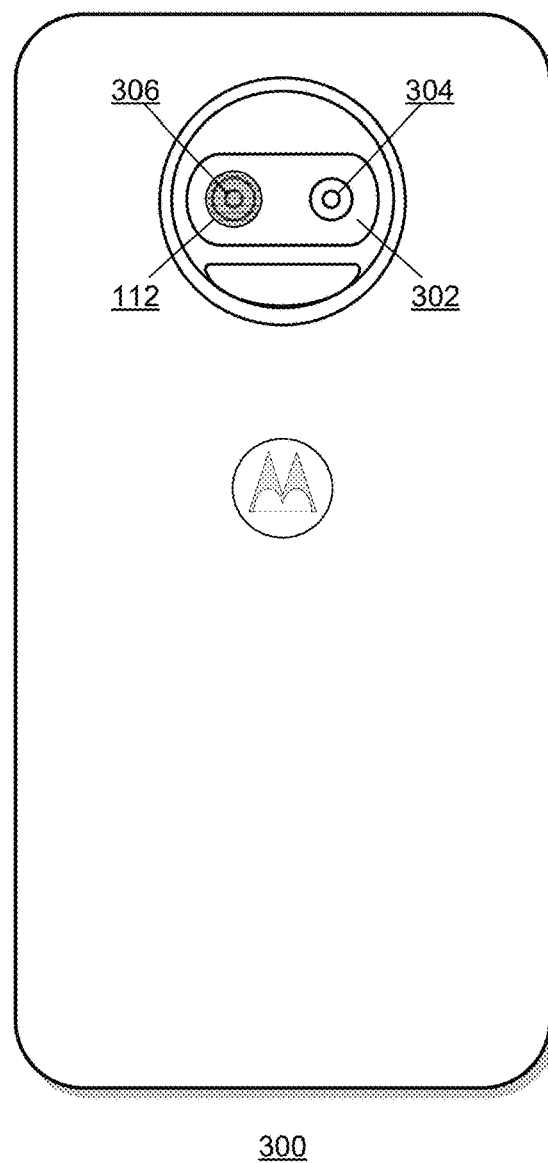
FIG. 3 further illustrates an example camera device for digital image capture with a polarizer at different rotation angles to implement the techniques as described herein.

FIG. 3 illustrates an example mobile device 300 in which aspects of digital image capture with a polarizer at different rotation angles can be implemented. The example mobile device 300 includes any type of a mobile device, such as the mobile phone 202 that includes a polarizer and a rotation device, either as integrated components of the mobile device 300 or as an attachment that operates with the mobile device. Generally, the mobile device 300 is any type of an electronic and/or computing device implemented with various components, such as a processing system and memory, as well as any number and combination of different components as further described with reference to the example device shown in FIG. 9. The mobile device 300 may be implemented as the mobile device 106 that is shown and described with reference to FIG. 1, or as the mobile phone 202 that is shown and described with reference to FIG. 2.

In this example, the mobile device 300 includes a dual-camera device 302 having a first imager 304 and a second imager 306. A polarizer 112 is positioned to operate with the second imager 306 and rotate by the rotation control device 116 (not shown). This dual-camera device implementation enables the first imager 304 to receive full or unfiltered light, and the second imager 306 receives filtered light via the polarizer 112.

The imaging algorithm 118 can be implemented to capture, process, and store multiple filtered digital images with the second imager 306 as described above. The imaging algorithm 118 can also capture, process, and store one or more unfiltered digital images with the first imager 304. In implementations, the imaging algorithm 118 can utilize the unfiltered light images captured by the first imager 304 to modify image brightness values of the filtered digital images captured by the second imager 306. For example, the imaging algorithm 118 can modify the image brightness values of the filtered digital images based on a multiplier determined from lux of the filtered and unfiltered digital images. The multiplier can be determined by the following equation:

$$r_i = \frac{Lux_i}{Lux_{unfiltered\ image}} \quad \text{eq. 4}$$

As shown in equation 4 above, the multiplier for each of the filtered digital images ($r_i$, where i is an image identifier of one of the filtered digital images) is based on the lux value for a particular filtered digital image ($Lux_i$) and a lux value of the unfiltered digital image ($Lux_{unfiltered\ image}$). The imaging algorithm 118 can then modify the pixel brightness values for each of the filtered digital images based on the respective multiplier, as noted above in equation 3.

The imaging algorithm 118 can then determine a common region in the filtered digital images and select an output image using the techniques discussed herein. Additionally, the imaging algorithm 118 can combine the output image 124 and one of the unfiltered digital images to create a final image that is stored in memory of the mobile device 300 or at a network storage device. In this way, a mobile device having a dual-camera device can take advantage of using the polarizer without sacrificing much of the light loss associated with polarizers.

Figure 4:
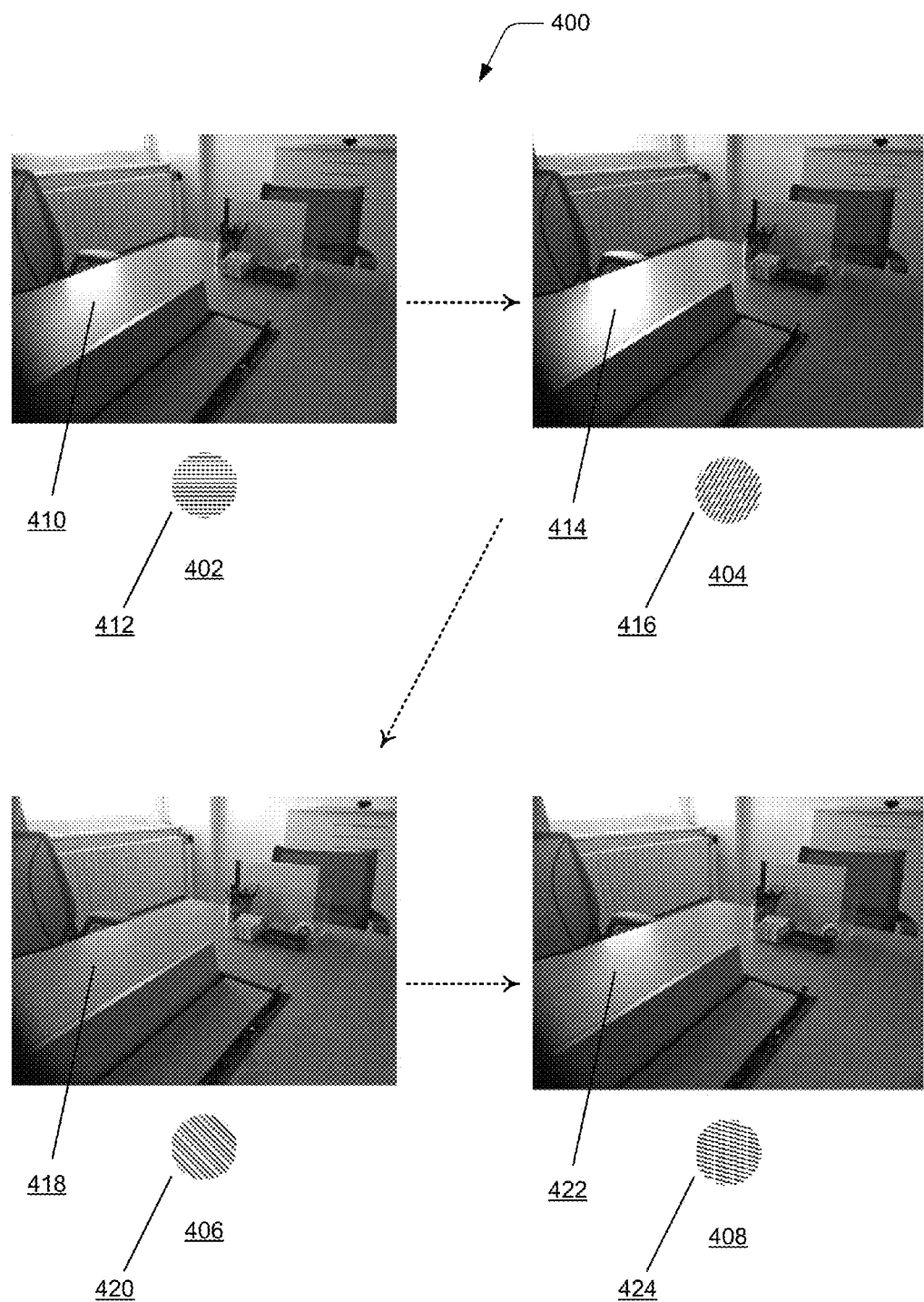
FIG. 4 illustrates examples of captured images utilizing the example camera device for digital image capture with a polarizer at different rotation angles as described herein.

FIG. 4 illustrates examples of captured digital images 400 in aspects of digital image capture with a polarizer at different rotation angles utilizing the imaging algorithm 118. As described above, the camera device 102 can rapidly capture multiple digital images with the imager 108 of the camera device, such that each of the captured digital images is captured at one of the different rotation angles of the polarizer 112. In this example, the camera device has sequentially captured at least four digital images, such as example images 402, 404, 406, and 408, at different rotation angles of the polarizer 112.

As shown in the first example image 402, a light reflection 410 is captured in the image scene at a zero degree (0°) rotation orientation 412 of the polarizer 112. As shown in the second example image 404, a light reflection 414 is captured in the image scene at a sixty degree (60°) rotation orientation 416 of the polarizer 112. It can be seen that the light reflection 414 in the second example image 404 is noticeably brighter than the light reflection 410 in the first example image 402 because of the light that passes through the polarizer 112 is being filtered at the zero and sixty degree rotation angles of the polarizer.

As shown in the third example image 406, a light reflection 418 is captured in the image scene at a one-hundred-and-thirty-five degree (135°) rotation orientation 420 of the polarizer 112. It can be seen that the light reflection 418 in the third example image 406 is substantially less bright than the light reflections 410, 414 in the respective example images 402, 404 because of the light that passes through the polarizer 112 is being filtered at the one-hundred-and-thirty-five degree (135°) angle.

Similarly, as shown in the fourth example image 408, a light reflection 422 is captured in the image scene at a one-hundred-and-sixty-five degree (165°) rotation orientation 424 of the polarizer 112. It can be seen that the light reflection 422 in the fourth example image 408 is less bright than the light reflections 410, 414 in the respective example images 402, 404, and the light reflection 422 is brighter than the light reflection 418 in the example image 406.

The imagining algorithm 118 can determine a common region in each of the captured digital images 400, which can be visualized as the varying brightness of the light reflections 410, 414, 418, and 422 in the respective captured digital images. As noted above, the imaging algorithm 118 can determine the common region 130 in each of the captured digital images 400 based on a standard deviation of brightness for each pixel in the captured digital images, which is further described below with reference to FIG. 5.

Figure 5:
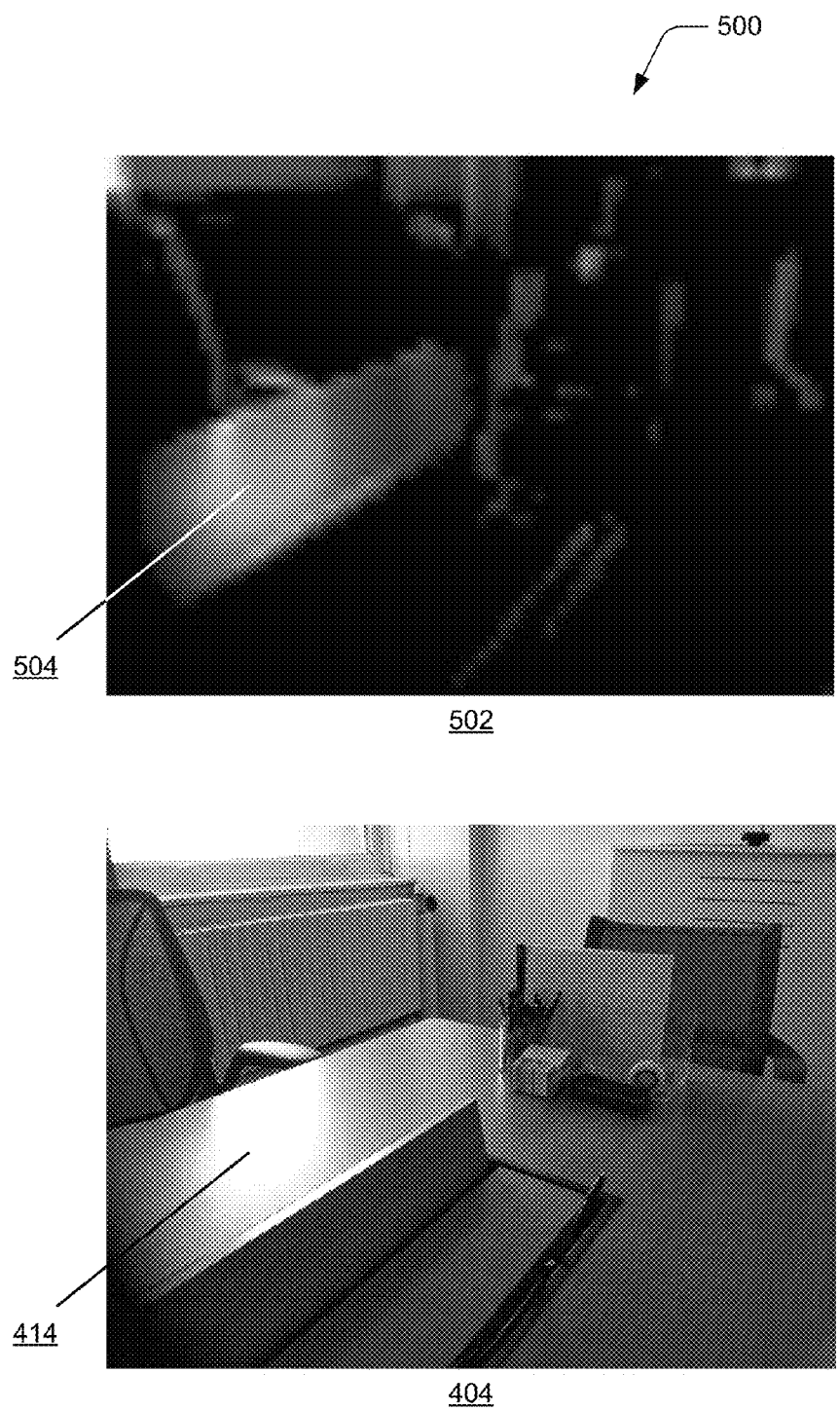
FIG. 5 illustrates an example visualization of a common region in the examples of the captured digital images for digital image capture with a polarizer at different rotation angles as described herein.

FIG. 5 illustrates an example 500 of a visualization image 502 of a common region in the examples of the captured digital images 400 in aspects of digital image capture with a polarizer at different rotation angles utilizing the imaging algorithm 118. As shown in the example 500, the visualization image 502 represents a heatmap that indicates areas or regions in the captured digital images 400 with a standard deviation greater than a particular threshold. In this example, the example visualization image 502 illustrates the heatmap having areas with a standard deviation of brightness greater than fifteen (15) on a scale of zero to two-hundred-and-fifty-five (0-255). The colors shown in the example visualization image 502 represent the pixels in the captured digital images 400 that have a standard deviation of brightness greater than fifteen (15), such that brighter colors represent higher values of the standard deviation of brightness.

The imaging algorithm 118 can determine the common region 130 as an area of pixels in the captured digital images 400 having a standard deviation of brightness greater than fifteen (15). As shown in the example visualization image 502, the heatmap indicates an area or region of pixels 504 in the captured digital images 400 that is the common region in each of the captured digital images. For comparison, as shown in the example image 404, the glare or light reflection 414 appears in the area or region of pixels 504 defined as the common region 130 in the captured digital images 400.

The imaging algorithm 118 can then determine pixel brightness values in the common region 130 for each of the captured digital images 400, and select one of the captured digital images 400 as the output image 124. In implementations, the imaging algorithm 118 can average the pixel brightness values in the common region 130 for each of the captured digital images 400. With reference to FIG. 4, it can been seen that the light reflections 410, 414, 418, and 422 appear within the common region 130 (as indicated by the area or region of pixels 504) and is the main contributing factor for the average pixel brightness values in the common region. As shown in the example image 406, the light reflection 418 is the least bright compared to the other light reflections 410, 414, and 422 of the respective digital images 402, 404, and 408, and results in the average pixel brightness values in the common region 130 of the example image 406 being the lowest when compared to the other example images 402, 404, and 408.

The imaging algorithm 118 can then select the example image 406 of the captured digital images 400 as the output image 124 because the example image 406 has the lowest average pixel brightness values in the common region 130. In this way, the imaging algorithm 118 selects the output image 124 as the representative of the multiple captured digital images 110 that generally has the least glare or surface reflections in the digital image.

Figure 6:
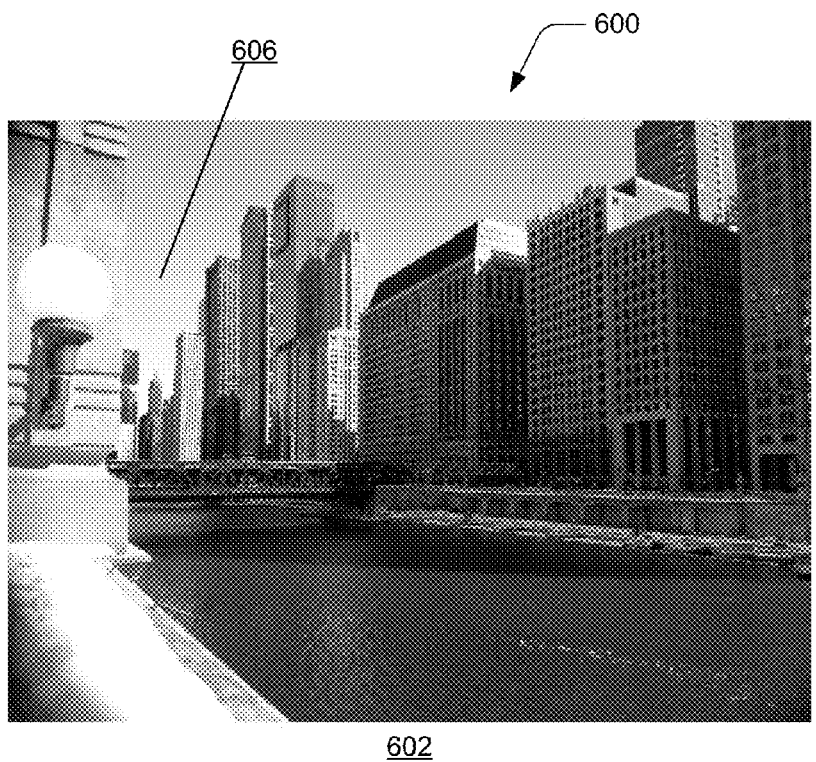
FIG. 6 illustrates examples of captured images utilizing the example camera device for digital image capture with a polarizer at different rotation angles as described herein.
Figure 6:
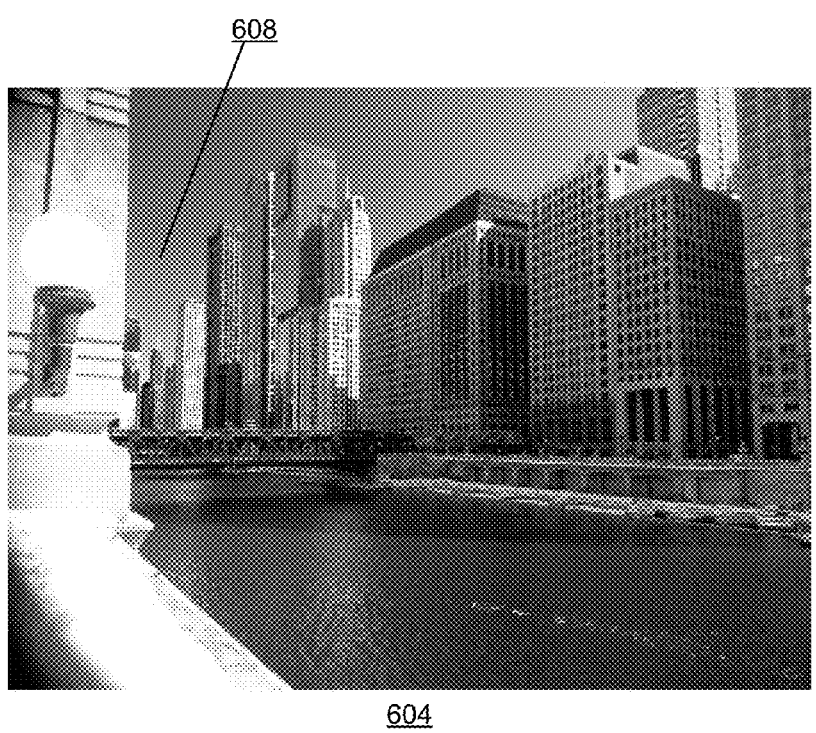

FIG. 6 illustrates examples of captured digital images 600 in aspects of digital image capture with a polarizer at different rotation angles utilizing the imaging algorithm 118. As described above, the camera device 102 can rapidly capture multiple digital images with the imager 108 of the camera device, such that each of the captured digital images is captured at one of the different rotation angles of the polarizer 112. In this example, the camera device has captured at least two digital images, such as example images 602 and 604 at different rotation angles of the polarizer 112.

Similar to the description above with reference to FIGS. 4 and 5, the imaging algorithm 118 can determine a common region in the captured digital images 600 as an area of pixels having a standard deviation of brightness greater than a threshold value on a scale from zero to two-hundred-and-fifty-five (0-255). As shown in the captured digital images 600, the sky 606 in the example image 602 appears brighter than the sky 608 in the example image 604 because of rotation orientations of the polarizer 112 when the images were captured.

The imagining algorithm 118 can determine a common region in the captured digital images 600, which can be visualized as the varying brightness of the sky 606, 608 in the respective example images 602, 604. Specifically, the imaging algorithm 118 determines the common region 130 in the captured digital images 600 based on a standard deviation of brightness for each pixel in the captured digital images 600 being greater than a threshold value as described herein. The area of the sky varies in brightness in the captured digital images 600 greater than the designated threshold value.

The imaging algorithm 118 can then determine pixel brightness values in the common region for each of the captured digital images 600, and select one of the captured images as the output image 124. In this example, it can be seen that the sky 608 in the example image 604 is the least bright when compared to the sky 606 in the example image 602, which results in the average pixel brightness values in the common region of the example image 604 being the lowest compared to the common region of the example image 602. The imaging algorithm 118 can then select the example image 604 of the captured digital images 600 as the output image 124 because the example image 604 has the lowest average pixel brightness values in the common region. In this way, the imaging algorithm 118 selects a representative output image among the multiple captured digital images 600 that generally has better enhanced colors or highlights in the digital image.

Example methods 700 and 800 are described with reference to respective FIGS. 7 and 8 in accordance with implementations of digital image capture with a polarizer at different rotation angles. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
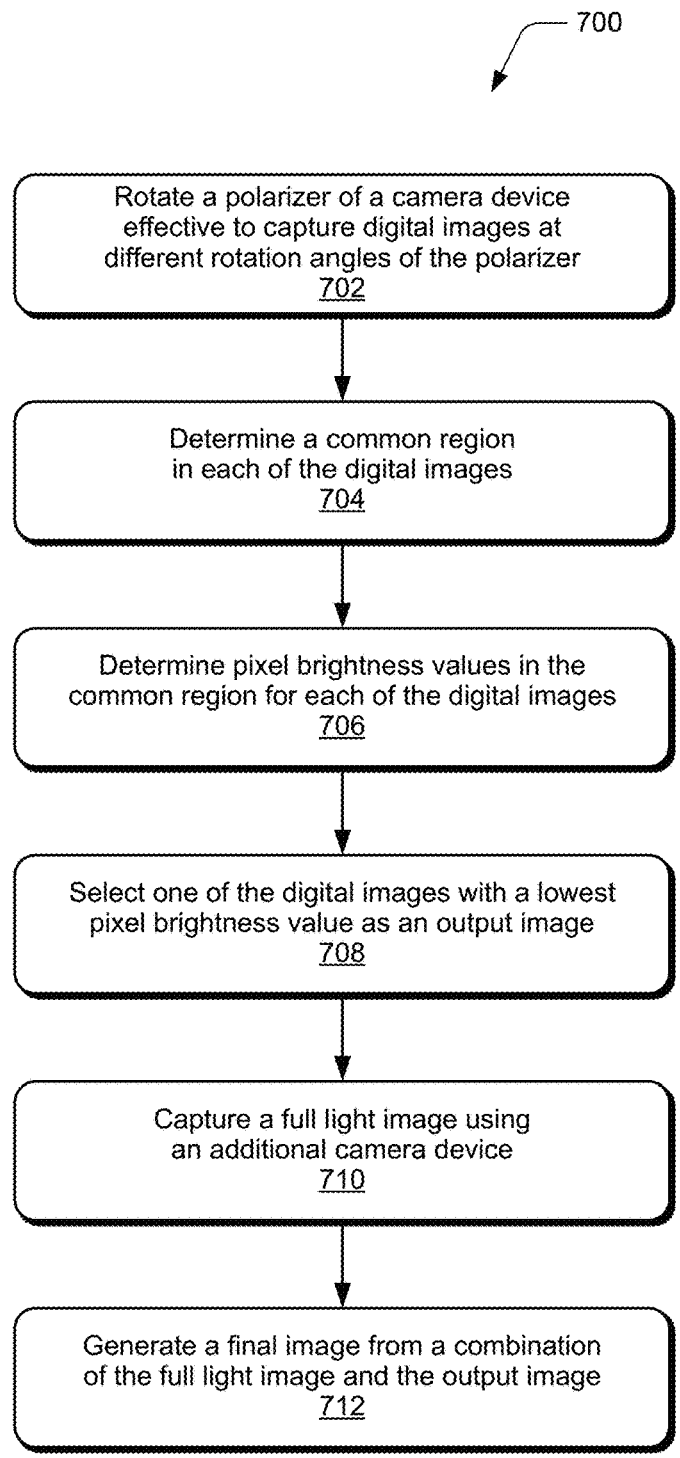
FIG. 7 illustrates an example method of digital image capture with a polarizer at different rotation angles in accordance with one or more implementations of the techniques described herein.

FIG. 7 illustrates example method(s) 700 of digital image capture with a polarizer at different rotation angles. The order in which the method is described is not intended to be construed as a limitation, and any number or combination of the described method operations can be performed in any order to perform a method, or an alternate method.

At 702, a polarizer of a camera device is rotated effective to capture digital images at different rotation angles of the polarizer. For example, the rotation function 120 is invoked by the imaging algorithm 118 to rotate the polarizer 112 by communicating commands or signals to the rotation control device 116. The control function 122 is then invoked by the imaging algorithm 118 to activate the imager 108 to capture the light 114 that passes through the polarizer 112 based on the rotational orientation of the polarizer 112. In this example method, the digital images 110 are captured at a constant exposure of the camera device 102, and each of the digital images 110 are captured at one of the different rotation angles of the polarizer 112 by rotating the polarizer from zero (0°) to one-hundred-and-eighty degrees (180°). In some implementations, the imaging algorithm 118 captures the digital images 110 at fifteen degree increments by rotating the polarizer 112 from zero (0°) to at least one-hundred-and-sixty-five degrees (165°).

At 704, a common region in each of the digital images is determined. For example, the common region function 128 is invoked by the imaging algorithm 118 to determine the common region in each of the captured digital images 110. The common region 130 in a respective digital image is determined based on a standard deviation of brightness for each pixel in the respective digital image. In implementations, the common region function 128 of the imaging algorithm 118 determines the common region 130 as an area of pixels in the captured digital images 110 having a standard deviation of brightness greater than a threshold value on a scale from zero to two-hundred-and-fifty-five (0-255).

At 706, pixel brightness values in the common region are determined for each of the digital images. For example, the image analysis function 126 is invoked by the imaging algorithm 118 to determine the pixel brightness values in the common region 130 for each of the captured digital images 110, such as by averaging the pixel brightness values in the common region 130 for each of the captured digital images. At 708, one of the digital images with a lowest pixel brightness value is selected as an output image. For example, the image analysis function 126 is invoked by the imaging algorithm 118 to select one of the captured digital images 110 that has a lowest pixel brightness value in the common region 130 as the output image 124, such as the captured digital image that has the lowest average pixel brightness value in the common region 130.

At 710, a full light image using an additional camera device is captured. For example, the control function 122 is invoked by the imaging algorithm 118 to activate the second imager 306 of the mobile device 300 to capture a full light or unfiltered image. At 712, a final image is generated from a combination of the full light image and the output image. For example, the output image 124 is combined with one of the unfiltered digital images by the imaging algorithm 118 to create a final image.

Figure 8:
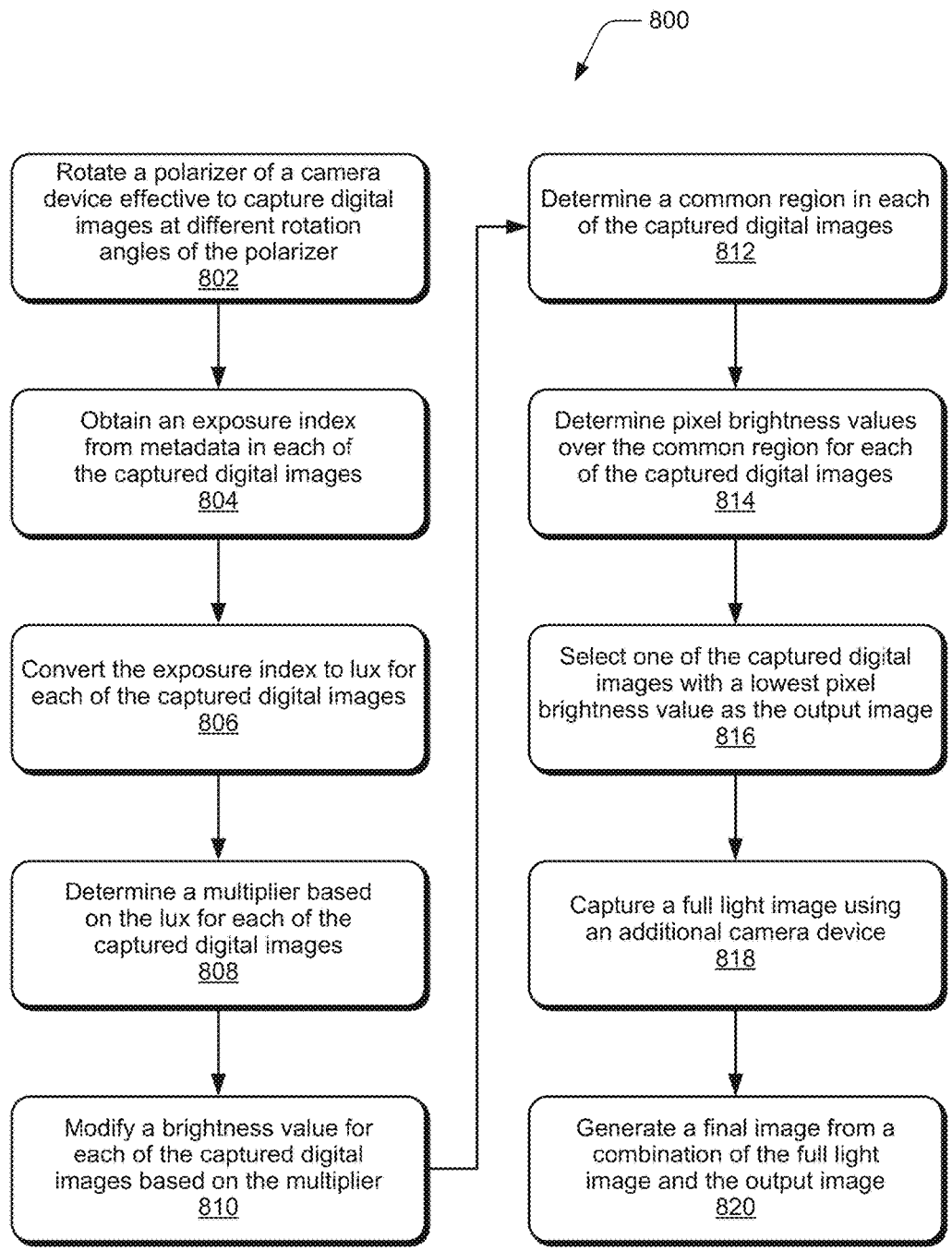
FIG. 8 illustrates an example method of digital image capture with a polarizer at different rotation angles in accordance with one or more implementations of the techniques described herein.

FIG. 8 illustrates example method(s) 800 of digital image capture with a polarizer at different rotation angles. The order in which the method is described is not intended to be construed as a limitation, and any number or combination of the described method operations can be performed in any order to perform a method, or an alternate method.

At 802, a polarizer of a camera device is rotated effective to capture digital images at different rotation angles of the polarizer. For example, the rotation function 120 is invoked by the imaging algorithm 118 to rotate the polarizer 112 by communicating commands or signals to the rotation control device 116. The control function 122 is invoked by the imaging algorithm 118 to activate the imager 108 to capture the light 114 that passes through the polarizer 112 based on the rotational orientation of the polarizer 112. In this example method, the digital images 110 are captured at different exposures of the camera device 102, and each of the digital images 110 are captured at one of the different rotation angles of the polarizer 112 by rotating the polarizer 112 from zero (0°) to one-hundred-and-eighty degrees (180°). In some implementations, the imaging algorithm 118 captures the digital images 110 at fifteen degree increments by rotating the polarizer 112 from zero (0°) to at least one-hundred-and-sixty-five degrees (165°).

At 804, an exposure index is obtained for each of the captured digital images. For example, an exposure index is obtained from the image metadata for each of the captured digital images 110 by the image analysis function 126 of the imaging algorithm 118, where the exposure index of a respective digital image corresponds to scene brightness. At 806, the exposure index is converted to lux for each of the captured digital images. For example, the exposure index is converted to lux (a unit of illumination) for each of the captured digital images 110 by the image analysis function 126. The conversion from the exposure index to lux can be expressed by the equation one (eq. 1) shown above.

At 808, a multiplier is determined based on the lux for each of the captured digital images. For example, a multiplier for each of the captured digital images 110 is determined by the image analysis function 126. The determination of the multiplier can be expressed by the equation two (eq. 2) shown above. At 810, a brightness value for each of the captured digital images is modified based on the multiplier. For example, the pixel brightness value for each of the captured digital images 110 is modified by the image analysis function 126 based on a respective multiplier to compensate for one or more of the digital images being captured at different exposures of the camera device 102. The modification of the pixel brightness can be expressed by the equation three (eq. 3) shown above.

At 812, a common region in each of the captured digital images is determined. For example, the common region function 128 is invoked by the imaging algorithm 118 to determine the common region in each of the captured digital images 110. The common region 130 in a respective digital image is determined based on a standard deviation of brightness for each pixel in the respective digital image. In implementations, the imaging algorithm 118 determines the common region 130 as an area of pixels in the captured digital images 110 having a standard deviation of brightness greater than a threshold value on a scale from zero to two-hundred-and-fifty-five (0-255).

At 814, pixel brightness values in the common region are determined for each of the captured digital images. For example, the image analysis function 126 is invoked by the imaging algorithm 118 to determine the pixel brightness values in the common region 130 for each of the captured digital images 110, such as by averaging the pixel brightness values in the common region 130 for each of the captured digital images 110. At 816, one of the captured digital images with a lowest pixel brightness value is selected as an output image. For example, the image analysis function 126 is invoked by the imaging algorithm 118 to select one of the captured digital images 110 that has a lowest pixel brightness value in the common region 130 as the output image 124, such as the captured digital image 110 that has the lowest average pixel brightness value in the common region 130.

At 818, a full light image is captured using an additional camera device. For example, the control function 122 is invoked by the imaging algorithm 118 to activate the second imager 306 to capture a full light or unfiltered image. At 820, a final image is generated from a combination of the full light image and the output image. For example, the imaging algorithm 118 combines the output image 124 with one of the unfiltered digital images to create a final image.

Figure 9:
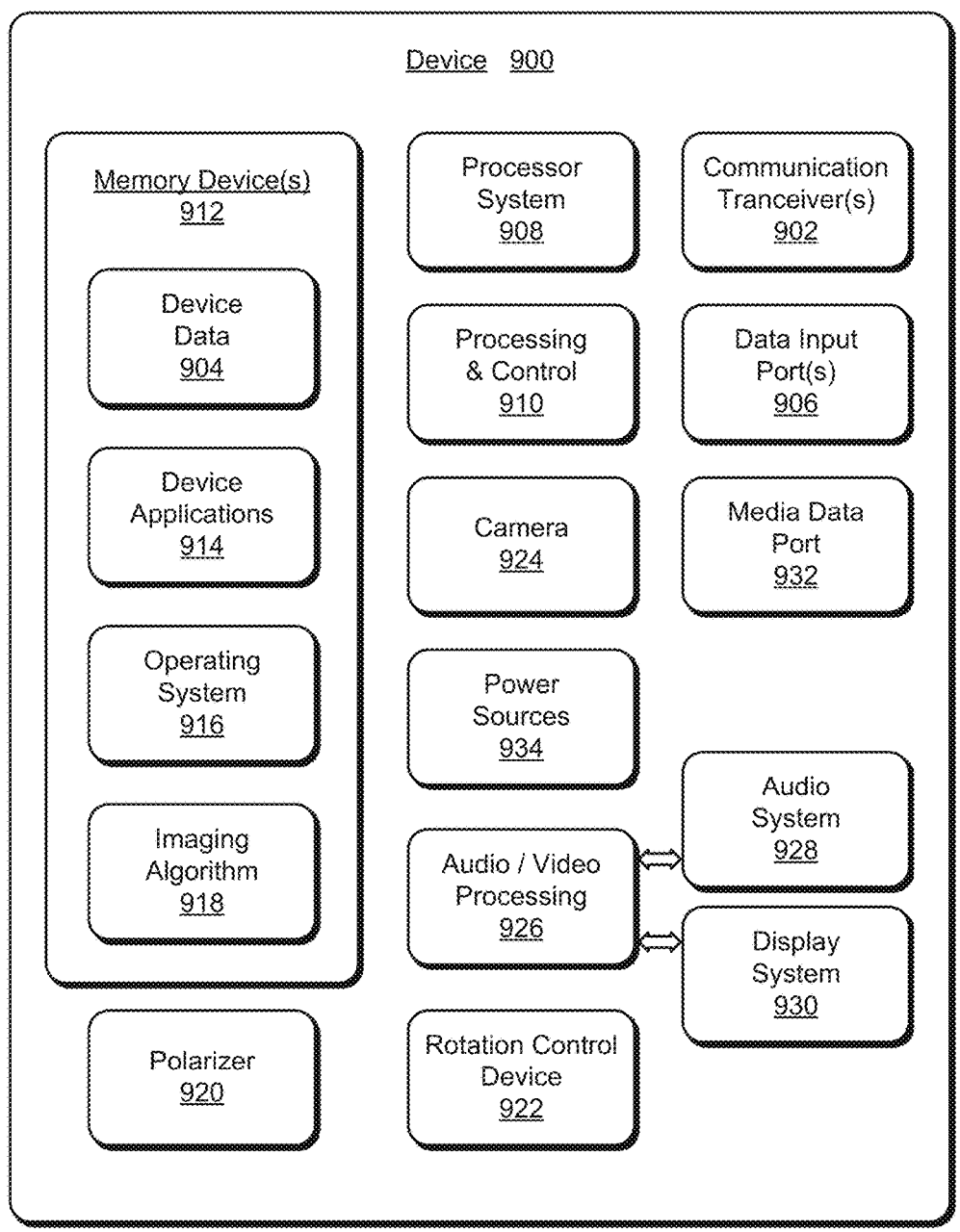
FIG. 9 illustrates various components of an example device that can implement aspects of digital image capture with a polarizer at different rotation angles.

FIG. 9 illustrates various components of an example device 900, which can implement examples of digital image capture with a polarizer at different rotation angles. The example device 900 can be implemented as any of the devices described with reference to the previous FIGS. 1-8, such as any type of mobile device, mobile phone, client device, wearable device, tablet, computing, communication, entertainment, gaming, media playback, and/or other type of electronic device. For example, the camera device 102, the camera device 200, and the mobile device 300 shown and described with reference to FIGS. 1-3 may be implemented as the example device 900. Further a wearable device may include any one or combination of a watch, armband, wristband, bracelet, glove or pair of gloves, glasses, jewelry items, clothing items, any type of footwear or headwear, and/or other types of wearables.

The device 900 includes communication transceivers 902 that enable wired and/or wireless communication of device data 904 with other devices. The device data 904 can include any of the digital images and image metadata, as well as common regions, lux, pixel brightness values, multipliers, standard deviation of brightness values, and modified images that are determined and/or generated. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 900 may also include one or more data input ports 906 via which any type of data, media content, and/or inputs can be received, such as user-selectable inputs to the device, messages, music, television content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 900 includes a processing system 908 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 910. The device 900 may further include any type of a system bus or other data and command transfer system that couples the various components within the device. A system bus can include any one or combination of different bus structures and architectures, as well as control and data lines.

The device 900 also includes computer-readable storage memory 912 that enables data storage, such as data storage devices that can be accessed by a computing device, and that provide persistent storage of data and executable instructions (e.g., software applications, programs, algorithms, functions, and the like). Examples of the computer-readable storage memory 912 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory devices in various memory device configurations. The device 900 may also include a mass storage media device.

The computer-readable storage memory 912 provides data storage mechanisms to store the device data 904, other types of information and/or data, and various device applications 914 (e.g., software applications). For example, an operating system 916 can be maintained as software instructions with a memory device and executed by the processor system 908. The device applications may also include a device manager, such as any form of a control application, software application, signal-processing and control module, code that is native to a particular device, a hardware abstraction layer for a particular device, and so on.

In this example, the device 900 includes an imaging algorithm 918 that implements features and aspects of digital image capture with a polarizer at different rotation angles, and may be implemented with hardware components and/or in software, such as when the device 900 is implemented as the camera device 102, the camera device 200, or as the mobile device 300 described with reference to FIGS. 1-3. An example of the imaging algorithm 918 is the imaging algorithm 118 implemented as a software application and/or as hardware components in the camera device 102 as described and shown in the previous figures. In implementations, the imaging algorithm 918 may include independent processing, memory, and logic components as a computing and/or electronic device integrated with the example device 900.

The device 900 also includes a polarizer 920 and a rotation control device 922 that implements features and aspects of digital image capture with a polarizer at different rotation angles, and may be implemented with hardware components and/or in software, such as when the device 900 is implemented as the camera device 102, the camera device 200, or as the mobile device 300 described with reference to FIGS. 1-3. Examples of the polarizer 920 and the rotation control device 922 are the polarizer 112 and the rotation control device 116 that are implemented as integrated components of the camera device 102 or as an attachment that operates with the camera device.

In this example, the device 900 also includes a camera 924, such as when the camera device 102, the camera device 200, or the mobile device 300 is implemented as the example device 900. Examples of the camera 924 include the imager 108, the camera 216, and the first imager 304 and the second imager 306 of the dual-camera device 302 as shown and/or described with reference to FIGS. 1-3.

The device 900 also includes an audio and/or video processing system 926 that generates audio data for an audio system 928 and/or generates display data for a display system 930. An example of the display system 930 is the display device 212 of the camera device 200. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 932. In implementations, the audio system and/or the display system are integrated components of the example device. Alternatively, the audio system and/or the display system are external, peripheral components to the example device.

The device 900 can also include one or more power sources 934, such as when the device is implemented as a mobile device or portable camera device. The power sources may include a charging and/or power system, and can be implemented as a flexible strip battery, a rechargeable battery, a charged super-capacitor, and/or any other type of active or passive power source. An example of the power sources 934 is the power source 210 of the camera device 200.

Although implementations of digital image capture with a polarizer at different rotation angles have been described in language specific to features and/or methods, the subject of the appended claims is not necessarily limited to the specific features or methods described. Rather, the specific features and methods are disclosed as example implementations of digital image capture with a polarizer at different rotation angles, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, comprising: capturing digital images with a camera device having a polarizer that filters light at different polarizations, each of the digital images captured at one of different rotation angles of the polarizer; determining an output image from the captured digital images, the determining including: determining a common region in each of the digital images, the common region having a variable brightness in each of the digital images and the common region in a respective digital image being determined based on a standard deviation of brightness for each pixel in the respective digital image; determining pixel brightness values of the pixels in the common region for each of the digital images; and selecting one of the captured digital images with a lowest pixel brightness value in the common region as the output image.

Alternatively or in addition to the above described method, any one or combination of: rotating the polarizer effective to capture the digital images at the different rotation angles of the polarizer. The capturing the digital images comprises capturing each of the digital images at one of the different rotation angles of the polarizer by said rotating the polarizer from zero (0°) to one-hundred-and-eighty degrees (180°). The capturing the digital images comprises capturing the digital images at designated degree increments by said rotating the polarizer from zero (0°) to one-hundred-and-eighty degrees (180°). Each of the digital images are captured at a constant exposure of the camera device. Further comprising capturing a full light image using an additional camera device, and generating a final image from a combination of the full light image and the output image. The common region is an area of pixels in each of the digital images where the standard deviation of brightness is greater than a threshold value.

A method, comprising: capturing digital images with a camera device having a polarizer that filters light at different polarizations, each of the digital images captured at one of different rotation angles of the polarizer, one or more of the captured digital images being captured at different exposures of the camera device; determining an output image from the captured digital images, the determining including: modifying pixel brightness values for each of the digital images effective to compensate for the one or more digital images captured at the different exposures of the camera device; determining a common region in each of the digital images, the common region depicted in each of the digital images and a brightness of light in the common region changes with each respective digital image based on a corresponding different rotation angle of the polarizer; determining the pixel brightness values in the common region for each of the digital images; and selecting one of the captured digital images with a lowest pixel brightness value in the common region as the output image.

Alternatively or in addition to the above described method, any one or combination of: the modifying the pixel brightness values for each of the digital images comprises: obtaining an exposure index for each of the digital images; converting the exposure index to lux for each of the digital images; determining a multiplier based on the lux for each of the digital images; and said modifying the pixel brightness values for each of the digital images based on the multiplier. Further comprising rotating the polarizer effective to capture the digital images at the different rotation angles of the polarizer. The capturing the digital images comprises capturing each of the digital images at one of the different rotation angles of the polarizer by said rotating the polarizer from zero (0°) to one-hundred-and-eighty degrees (180°). The determining the common region in each of the digital images comprises determining a standard deviation of brightness for each pixel of the digital images. The common region is an area of pixels in each of the digital images where the standard deviation of brightness is greater than a threshold value.

A device, comprising: a polarizer to filter light at different polarizations; a camera device to capture digital images using the polarizer, each of the digital images captured at one of different rotation angles of the polarizer; a memory and processor system to execute an imaging algorithm configured to: determine a common region in each of the digital images, the common region having a variable brightness in each of the digital images and the common region in a respective digital image determined based on a standard deviation of brightness for each pixel in the respective digital image; determine pixel brightness values of the pixels in the common region for each of the digital images; and select one of the captured digital images with a lowest pixel brightness value in the common region as an output image.

Alternatively or in addition to the above described device, any one or combination of: the imaging algorithm is configured to initiate rotating the polarizer effective to capture the digital images at the different rotation angles of the polarizer. Each of the digital images are captured at one of the different rotation angles of the polarizer by rotating the polarizer from zero (0°) to one-hundred-and-eighty degrees (180°). The common region is an area of pixels in each of the digital images where the standard deviation of brightness is greater than a threshold value. Each of the digital images are captured at a constant exposure of the camera device. One or more of the digital images are captured at different exposures of the camera device. The imaging algorithm is configured to modify the pixel brightness values for each of the digital images effective to compensate for the one or more digital images captured at the different exposures of the camera device.

The invention claimed is:

1. A method, comprising:
    capturing digital images with a camera device having a polarizer that filters light at different polarizations, each of the digital images captured at one of different rotation angles of the polarizer;
    determining an output image from the captured digital images, the determining including:
        determining a common region in each of the digital images, the common region having a variable brightness in each of the digital images and the common region in a respective digital image being determined based on a standard deviation of brightness for each pixel in the respective digital image;
        determining pixel brightness values of the pixels in the common region for each of the digital images; and
        selecting one of the captured digital images with a lowest pixel brightness value in the common region as the output image.

2. The method as recited in claim 1, further comprising rotating the polarizer effective to capture the digital images at the different rotation angles of the polarizer.

3. The method as recited in claim 2, wherein the capturing the digital images comprises capturing each of the digital images at one of the different rotation angles of the polarizer by said rotating the polarizer from zero (0°) to one-hundred-and-eighty degrees (180°).

4. The method as recited in claim 2, wherein the capturing the digital images comprises capturing the digital images at designated degree increments by said rotating the polarizer from zero (0°) to one-hundred-and-eighty degrees (180°).

5. The method as recited in claim 1, wherein each of the digital images are captured at a constant exposure of the camera device.

6. The method as recited in claim 1, further comprising:
    capturing a full light image using an additional camera device; and
    generating a final image from a combination of the full light image and the output image.

7. The method as recited in claim 1, wherein the common region is an area of pixels in each of the digital images where the standard deviation of brightness is greater than a threshold value.

8. A method, comprising:
    capturing digital images with a camera device having a polarizer that filters light at different polarizations, each of the digital images captured at one of different rotation angles of the polarizer, one or more of the captured digital images being captured at different exposures of the camera device;
    determining an output image from the captured digital images, the determining including:
        modifying pixel brightness values for each of the digital images effective to compensate for the one or more digital images captured at the different exposures of the camera device;
        determining a common region in each of the digital images, the common region depicted in each of the digital images and a brightness of light in the common region changes with each respective digital image based on a corresponding different rotation angle of the polarizer;
        determining the pixel brightness values in the common region for each of the digital images; and
        selecting one of the captured digital images with a lowest pixel brightness value in the common region as the output image.

9. The method as recited in claim 8, wherein the modifying the pixel brightness values for each of the digital images comprises:
    obtaining an exposure index for each of the digital images;
    converting the exposure index to lux for each of the digital images;
    determining a multiplier based on the lux for each of the digital images; and
    said modifying the pixel brightness values for each of the digital images based on the multiplier.

10. The method as recited in claim 8, further comprising rotating the polarizer effective to capture the digital images at the different rotation angles of the polarizer.

11. The method as recited in claim 10, wherein the capturing the digital images comprises capturing each of the digital images at one of the different rotation angles of the polarizer by said rotating the polarizer from zero (0°) to one-hundred-and-eighty degrees (180°).

12. The method as recited in claim 8, wherein the determining the common region in each of the digital images comprises determining a standard deviation of brightness for each pixel of the digital images.

13. The method as recited in claim 12, wherein the common region is an area of pixels in each of the digital images where the standard deviation of brightness is greater than a threshold value.

14. A device, comprising:
    a polarizer to filter light at different polarizations;
    a camera device to capture digital images using the polarizer, each of the digital images captured at one of different rotation angles of the polarizer;
    a memory and processor system to execute an imaging algorithm configured to:
        determine a common region in each of the digital images, the common region having a variable brightness in each of the digital images and the common region in a respective digital image determined based on a standard deviation of brightness for each pixel in the respective digital image;
        determine pixel brightness values of the pixels in the common region for each of the digital images; and
        select one of the captured digital images with a lowest pixel brightness value in the common region as an output image.

15. The device as recited in claim 14, wherein the imaging algorithm is configured to initiate rotating the polarizer effective to capture the digital images at the different rotation angles of the polarizer.

16. The device as recited in claim 14, wherein each of the digital images are captured at one of the different rotation angles of the polarizer by rotating the polarizer from zero (0°) to one-hundred-and-eighty degrees (180°).

17. The device as recited in claim 14, wherein the common region is an area of pixels in each of the digital images where the standard deviation of brightness is greater than a threshold value.

18. The device as recited in claim 14, wherein each of the digital images are captured at a constant exposure of the camera device.

19. The device as recited in claim 14, wherein one or more of the digital images are captured at different exposures of the camera device.

20. The device as recited in claim 19, wherein the imaging algorithm is configured to modify the pixel brightness values for each of the digital images effective to compensate for the one or more digital images captured at the different exposures of the camera device.

* * * * *